United States Patent
Liverman et al.

(10) Patent No.: US 7,430,895 B2
(45) Date of Patent: Oct. 7, 2008

(54) APPARATUS AND METHOD FOR INSPECTING QUALITY OF MOLDED FOAM PARTS

(75) Inventors: Ivan Neil Liverman, Middlesex, NC (US); Mark Edmund Maresh, Tucson, AZ (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/282,182

(22) Filed: Nov. 18, 2005

(65) Prior Publication Data

US 2007/0113620 A1 May 24, 2007

(51) Int. Cl.
*G01N 15/08* (2006.01)
(52) U.S. Cl. .............................. 73/38; 73/40
(58) Field of Classification Search ........... 73/199, 73/201
See application file for complete search history.

(56) References Cited

U.S. PATENT DOCUMENTS

| | | | |
|---|---|---|---|
| 2,448,955 A | 9/1948 | Bruce | |
| 3,889,521 A | 6/1975 | Jakimowicz | 73/38 |
| 4,718,270 A | 1/1988 | Storr | 73/38 |
| 4,864,845 A * | 9/1989 | Chandler et al. | 73/38 |
| 5,373,727 A | 12/1994 | Heller et al. | 73/38 |
| 5,832,409 A | 11/1998 | Ramakrishnan et al. | 702/12 |
| 6,655,192 B2 | 12/2003 | Chavdar | 73/38 |
| 6,766,835 B1 * | 7/2004 | Fima | 141/95 |

FOREIGN PATENT DOCUMENTS

| | | | |
|---|---|---|---|
| EP | 0146514 A2 | | 6/1985 |
| SE | EP 0146514 A2 * | | 6/1985 |

OTHER PUBLICATIONS

"PMI Porometers", www.pmiapp.comproducts/porometers.html, retrieved Oct. 7, 2005.
"PMI Permeameters", www.pmiapp.comproducts/permeameters.html, retrieved Oct. 7, 2005.
www.pmiapp.com/products/gas_permeameter, retrieved Apr. 14, 2004.

* cited by examiner

*Primary Examiner*—Hezron E. Williams
*Assistant Examiner*—Mark Shabman
(74) *Attorney, Agent, or Firm*—Duke W. Yee; Gregory M. Doudnikoff; James O. Skarsten

(57) ABSTRACT

Apparatus and method is provided for reliably testing a quality level of bead fusion in molded foam parts. Such apparatus may be portable and hand-held, and the test procedure will not destroy or damage tested products. In a useful embodiment comprising apparatus for monitoring quality of a molded foam part, an insertion device introduces a stream of selected gas under pressure into the interior of the molded foam part. The insertion device may include a thin nozzle to be inserted into the part. Poorly fused beads allow a faster flow rate of the gas than well fused beads, since the poor fusion will provide more openings for the gas to escape. Accordingly, the embodiment includes a sensor for measuring the flow rate of the stream of gas, as the stream is introduced into the part interior. An indicator mechanism, responsive to operation of the flow sensor, provides notice to a user of the apparatus that the gas flow rate does or does not exceed a pre-specified level, which indicates a corresponding level of part quality.

20 Claims, 1 Drawing Sheet

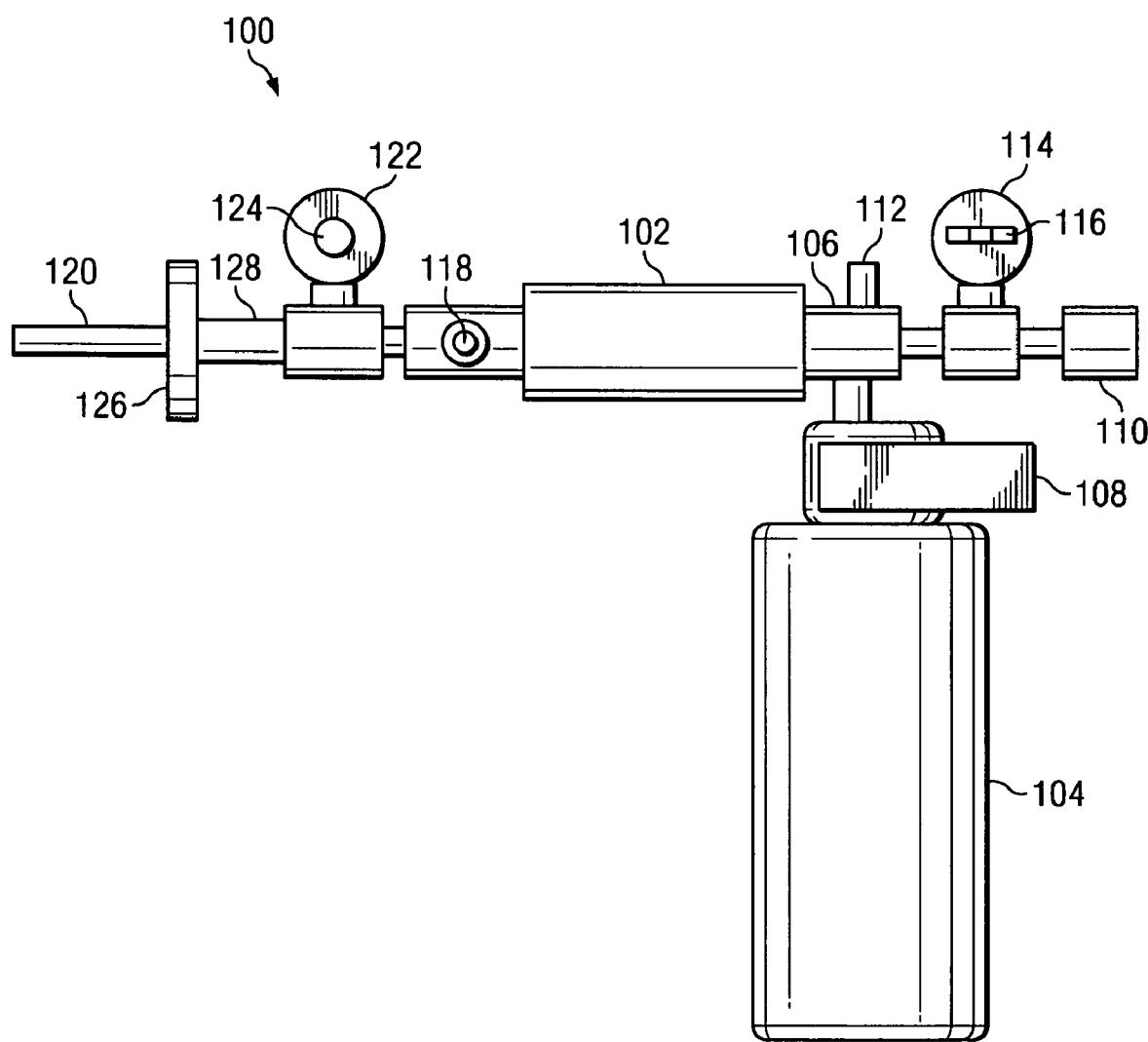

APPARATUS AND METHOD FOR INSPECTING QUALITY OF MOLDED FOAM PARTS

BACKGROUND OF THE INVENTION

1. Field of the Invention

The invention disclosed and claimed herein generally pertains to an apparatus and method for monitoring or inspecting molded foam parts. More particularly, the invention pertains to apparatus of the above type wherein the molded foam parts are formed by fusion of plastic beads. Even more particularly, the invention pertains to apparatus of the above type that enables inspection of molded foam part fusion to be improved, substantially simplified, and does not cause damage to the parts.

2. Description of the Related Art

Molded foam parts are used extensively, for package cushioning as well as for other important applications. For example, computer equipment and other electronic products typically must be protected against impact or rough handling, and may be of irregular shape. Accordingly, molded foam is commonly used to secure the product firmly within a shipping carton. The molded foam cushions also serve to protect the product from sudden shock, impacts or the like.

The manufacture of cushions or other parts from molded foam is comparatively inexpensive, and parts can be formed into virtually any shape desired. Molded foam parts are made by the fusion of plastic beads, where the beads are made from plastic material such as expandable polystyrene, polypropylene or polyethylene. The fusion occurs when plastic beads are placed inside a mold or other tooling, and subjected to steam heat and pressure to make them expand and fuse together. The beads are thus fused to form a part, wherein part shape is determined by the mold.

The strength and durability of molded foam parts is very important for many applications, particularly if the parts are to be used to cushion comparatively fragile parts or products as described above. Strength and cushioning characteristics of a molded foam part are largely determined by the quality of the bead fusion. This quality, in turn, is determined by the degree of fusion, that is, the extent to which the beads have bonded during the molding process. Clearly, for many applications it will be essential to know whether the bead fusion quality in a part is or is not at an acceptable level.

Currently, there are no known reliable and repeatable techniques available to measure bead fusion. Most current methods used to determine bead fusion are manual systems that require the destruction of the part being tested. For example, an inspector must break apart or cut the part being inspected, in order to visually inspect the bead fusion quality. More particularly, the inspector must view the expanded beads, to see if they remain intact or are torn apart, a torn bead being a sign of good fusion. By counting the ratio of intact beads to torn beads, a rough indication of fusion quality is provided. However, the beads are very small and it is frequently difficult to tell whether they are torn or not. Thus, this process tends to be unreliable, as well as being tedious, time-consuming and destructive to the tested part.

A further inspection method involves taking a cross-section of the part, and then increasing stress on the part until it cracks. Again, this method is destructive to the part but is still unreliable. The selection of the cross-section can cause stress lines in the material that affect the test, without necessarily indicating the over-all bead fusion quality. In a third method, a probe is placed on the surface of a molded foam part, to measure resistance. This method, while comparatively quick and non-destructive to the part, has proven to be unreliable. A skin that forms on the external wall of the part can prevent detection of fusion deficiencies that are deep within the part.

It is thus apparent that a new device or method is needed to test fusion quality in molded foam parts, wherein test results are accurate and reliable, and the tested parts are not destroyed or damaged. In addition, users of the device should require only a low level of training or skill.

BRIEF SUMMARY OF THE INVENTION

The invention generally provides an apparatus and method for reliably testing or measuring, with comparatively little effort, the quality of bead fusion in molded foam parts. Embodiments of the invention may be portable and handheld, and the test procedure does not destroy or damage tested products. In such embodiments, a thin nozzle is inserted into a part, and a fixed volume of air or other gas is released into the part interior. Poorly fused beads will allow a faster flow rate of the gas than well fused beads, since the poor fusion will provide more openings for the gas to escape. The device could thus be used by molded foam parts manufacturers to screen molded cushions for quality of bead fusion prior to shipping, which is generally not currently possible as described above. In one useful embodiment of the invention, apparatus is provided for monitoring quality level of a molded foam part. The apparatus comprises of an insertion device for introducing a stream of selected gas under pressure into the interior of the molded foam part, and further comprises a sensor for measuring the flow rate of the stream of gas, as the stream is introduced into the part interior. An indicator mechanism, responsive to operation of the flow sensor, provides notice to a user of the apparatus that the gas flow rate does or does not exceed a pre-specified level, which is associated with part quality.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawing, wherein:

The single FIGURE is a schematic diagram showing an embodiment of the invention.

DETAILED DESCRIPTION OF THE INVENTION

Referring to the FIGURE, there is shown a fusion meter device 100 for monitoring the quality of cushions or other molded foam parts, as described above. More particularly, device 100 may be used by an inspector to quickly determine whether the fusion quality of a molded part does or does not reach an acceptable pre-specified level. Device 100 is provided with an expansion chamber 102 having a fixed volume, and is further provided with a gas storage tank 104. The inlet (not shown) of chamber 102 is connected to tank 104 by means of a Tee fitting 106.

In order to fill the tank with a specified gas, a quick release connector 110 is also coupled to fitting 106. Connector 110 is connectible to a source or supply of the specified gas (not shown). When this has been done, shut-off valve 108 is opened to admit the specified gas into tank 104. In useful embodiments of the invention, the gas could be $CO_2$, nitrogen, or atmospheric air, but the invention is by no means limited thereto. When the tank 104 has been filled or charged, valve 108 is closed and the gas source is disconnected from connector 110.

Referring further to the FIGURE, there is shown a pressure adjustment valve 112 and a pressure gauge 114, respectively connected to expansion chamber 102 through fitting 106. Valve 112 is more particularly connected so that it may be opened to allow gas from tank 104 to enter chamber 102.

Gauge 114 may be either a digital or an analog pressure sensor, and is connected to continually show the air pressure within chamber 102 by a means of a readout 116. Thus, after tank 104 has been charged as described above, an operator of device 100 may use valve 112 and gauge 114 to fill chamber 102 with gas to a precise pre-specified pressure level. Shut-off valve 108 must be closed while this procedure is being carried out. The volume of gas in chamber 104 is determined by the known dimensions thereof. Accordingly, a user may readily fill expansion chamber 102 with a known quantity of the pre-specified gas.

The FIGURE further shows a trigger release valve 118 connected to the outlet (not shown) of chamber 102. Valve 118 is further connected, through a flow rate gauge 122 and a conduit 128, to a nozzle 120. Thus, by operating release valve 118, a user can cause gas under pressure to flow out through nozzle 120 from chamber 102. If the rate of such gas flow exceeds a pre-specified level, an indicator light 124 mounted on gauge 122 will be illuminated. Gauge 122 may be adjusted by a user of device 100 to set the level at which illumination occurs to a particular flow rate level. The FIGURE shows a flange member 126 positioned between gauge 122 and nozzle 120, as described hereinafter in further detail.

By providing fusion meter device 100 as described above, the task of testing molded foam parts for bead fusion quality is substantially simplified. Using device 100, an inspector may test a part for bead fusion quality by following a well-defined and straightforward procedure. For a particular part, the inspector is furnished with a corresponding set of specifications.

As a first step in the procedure, expansion chamber 102 is filled with gas from tank 104, and is set to a psi pressure level for the part that is indicated by the specifications. This step is carried out by means of shut-off valve 108, pressure gauge 114 and pressure adjustment valve 112, as described above. As a second step, a nozzle 120 specified for the particular part is attached for use with device 100.

To complete the test of the particular part, an elongated portion of the nozzle is inserted into the part at a location indicated by the specifications, so that flange 126 closely abuts the part surface. The single FIGURE shows the elongated portion extending rightward from the end of the nozzle, as viewed in the FIGURE, to flange 126. Release valve 118 is then depressed and held, while the inspector observes the indicator light 124. Usefully, flow rate gauge 122 is adjusted to illuminate light 124 only if a gas flow rate is detected that is high enough to indicate an unacceptable level of bead fusion quality. Accordingly, if the light does not illuminate, the inspector can conclude that bead fusion quality is acceptable and the particular part is good.

After testing the particular part, the inspector refills the expansion chamber 102 with gas to the specified pressure, and then proceeds to test another part. It will be seen that each part is tested using the same quantity of gas, so that a uniform standard is applied to all of the tests. The specifications used to test bead fusion quality for a particular type of part may be generated by conducting empirical tests on samples of the part.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Apparatus for monitoring bead fusion quality of molded foam parts comprising:
   a chamber having a fixed volume, for selectively retaining a quantity of a selected gas at a pre-specified pressure level;
   an adjustment valve provided to adjust the pressure of said quantity of gas retained in said chamber to said pre-specified pressure level;
   a nozzle adapted for insertion into a selected one of said molded parts, for introducing a stream of said selected gas under pressure into the interior of said selected part;
   a conduit and a single release valve coupled to provide a flow path extending from said chamber to said nozzle, wherein said single release valve is the only valve to be included in said flow path between said chamber and said nozzle, and said single release valve is operable to release said quantity of gas from said chamber, to flow along said flow path;
   a sensor for measuring the flow rate of said quantity of gas, as said quantity of gas flows along said flow path to said nozzle; and
   an indicator mechanism responsive to operation of said flow sensor to indicate whether or not said measured gas flow rate exceeds a pre-specified level associated with bead fusion quality.

2. The apparatus of claim 1, wherein:
   said single release valve comprises a quick release valve for enabling immediate release of said quantity of gas from said chamber, after said quantity of gas in said chamber has been adjusted to said pre-specified pressure level.

3. The apparatus of claim 2, wherein:
   said quick release valve comprises a manually operated trigger release valve.

4. The apparatus of claim 2, wherein:
   said chamber comprises an expansion chamber coupled to a source of said selected gas.

5. The apparatus of claim 4, wherein:
   a gauge is coupled to said adjustment valve to show the pressure of said gas in said expansion chamber.

6. The apparatus of claim 3, wherein:
   said nozzle includes an elongated portion disposed for insertion into said selected part, wherein said elongated portion extends from an end of said nozzle to a flange member adapted to form a seal with the external surface of said selected part, proximate to the location of said insertion.

7. The apparatus of claim 1, wherein:
   said sensor comprises a flow gauge for sensing the rate of gas flow from said chamber into said nozzle.

8. The apparatus of claim 6, wherein:
   said nozzle is adapted for insertion into a part formed by the fusion of beads made from a selected plastic material.

9. The apparatus of claim 7, wherein:
   said indicator mechanism comprises an indicator light responsive to said sensed rate of gas flow.

10. The apparatus of claim 9, wherein:
said indicator light is non-illuminated to indicate that said selected part has an acceptable level of bead fusion quality, when said gas flow rate is less than said pre-specified level.

11. The apparatus of claim 1, wherein:
said gas is selected from a group that includes at least atmospheric air, nitrogen and Co2.

12. Apparatus for monitoring bead fusion quality of a molded foam part comprising:
a chamber;
means for filling said chamber with a quantity of selected gas having a specified level of pressure;
means for directing a flow of said gas from said chamber into the interior of said part;
means for measuring the flow rate of said flow of gas; and
means responsive to said measuring means for providing notice that said bead fusion quality is or is not acceptable, according to whether said measured flow rate is less than or greater than a pre-specified level, respectively.

13. The apparatus of claim 12, wherein:
said filling means comprises a supply of said selected gas that is connectable to said chamber through a pressure gauge and a pressure adjustment valve.

14. The apparatus of claim 12, wherein:
said directing means comprises a nozzle coupled to said chamber and insertable into said part to a specified depth.

15. The apparatus of claim 12, wherein:
said measuring means comprises a flow rate gauge, and said means for providing notice comprises a light selectively illuminated by said flow rate gauge.

16. A method for monitoring bead fusion quality of a molded foam part, said method comprising the steps of:
selectively retaining a quantity of selected gas in a chamber having a fixed volume;
adjusting said quantity of gas retained in said chamber to a pre-specified pressure level;
inserting a nozzle into the interior of said molded part;
after said quantity of gas in said chamber has been adjusted to said pre-specified pressure level, immediately releasing said quantity of gas from said chamber;
routing said released quantity of gas along a flow path and through said nozzle into the interior of said part;
measuring the flow rate of said quantity of gas along said flow path; and
providing notice that said bead fusion quality is or is not acceptable, according to whether said measured flow rate is respectively less than or greater than a pre-specified level.

17. The method of claim 16, wherein:
said chamber is filled by connecting said chamber to a supply of said selected gas, through a pressure gauge and a pressure adjustment valve.

18. The method of claim 16, wherein:
said nozzle includes an elongated portion disposed for insertion into said part to a selected depth, wherein said elongated portion extends from an end of said nozzle to a flange member adapted to form a seal with the external surface of said part, proximate to the location of said insertion.

19. The method of claim 16, wherein:
said flow rate is measured by operating a flow rate gauge, and said notice is provided by a light selectively operated by said flow rate gauge.

20. The method of claim 16, wherein:
said gas is immediately released from said chamber by manual operation of a trigger release valve.

* * * * *